United States Patent Office 3,131,089
Patented Apr. 28, 1964

3,131,089
CARBON ARTICLE COATED WITH BORON CARBIDE AND BORON NITRIDE, AND PROCESS OF MAKING THE SAME
Carl A. Grulke, Berea, and Willie H. Watts, Fostoria, Ohio, assignors to Union Carbide Corporation, a corporation of New York
No Drawing. Filed Jan. 25, 1961, Ser. No. 84,764
10 Claims. (Cl. 117—215)

This invention relates to carbon articles having a corrosion resistant coating thereon and particularly relates to such an article which has a graphite base.

Graphite is a highly refractory material which has excellent thermal and electrical properties. This material has found use in the aluminum industry for crucibles for foundry work, induction and resistance heated containers, and vaporization boats. Graphite is relatively inert to the action of molten aluminum but it suffers from the disadvantage of being attacked by certain aluminum alloys both in the liquid and vaporous state.

Boron nitride could be advantageously used in this field because of its inertness to the corrosive action of liquid aluminum at high temperatures, or vaporous or liquid aluminum alloys. Unfortunately boron nitride does not have the electrical properties that make graphite so useful for the above-noted applications.

It would therefore be advantageous to prepare a material which combined the thermal and electrical properties of graphite with the chemical inertness and corrosion resistance of boron nitride to corrosive aluminum alloys. The art is replete with suggestions for the manufacture of articles made up of mechanical mixtures of boron nitride and graphite. The best of these suggestions at present seems to be a mixture of comminuted graphite and comminuted boron nitride with or without some suitable binder which has been molded to the desired shape and properly baked. In this method the baking is necessary in order to set up the binder. This method results in an article consisting of a graphite matrix with boron nitride substantially dispersed therethrough or a boron nitride matrix having graphite dispersed therethrough. Articles made by these prior methods suffer from the disadvantage that when such are placed in environments which are destructive of carbon or graphite, the destruction would not be prevented by the superior inertness of the boron nitride. The carbon or graphite would still be eaten away thereby more or less damaging the article.

It is, therefore, an object of the present invention to provide a carbon article protected by an inert boron nitride coating thereon.

It is another object of this invention to provide a commercially adequate method of making such an article.

The first object is fulfilled by the article of this invention which is a carbon article having a continuous coating of boron nitride thereon. Essentially a region of boron carbide must be present between the carbon and the boron nitride in order to securely bond the boron nitride to the carbon. Boron nitride exists in many forms depending upon the temperature of formation and upon the reactants used to make it. An important attribute of this invention is that the boron nitride coating may suitably be applied from substantially any source of boron nitride as long as the boron nitride is initially made at a temperature not higher than about 1200° C.

Fulfilling the second of the above-mentioned objects, an article in accord with the precepts of this invention may be manufactured by packing the carbon article to be coated in crude boron nitride; heating the packed article to a temperature between 1800° C. and 2300° C., at which temperature boron nitride will sublime and deposit on the carbon article; and cooling the thus coated article to room temperature, whereupon the coated article may be stored for subsequent use. It has been found desirable in some cases to have a nitrogenous atmosphere blanketing the packed article during the heating step. Examples of such an atmosphere which have been found to work well are ammonia, nitrogen, nitrogen-hydrogen mixtures, and ammonia-methane mixtures. The term "crude boron nitride" as used hereinabove and hereinafter refers to the unpurified reaction product obtained in the manufacture of boron nitride at a temperature not higher than about 1200° C. One example of such crude boron nitride would be the reaction product of boric acid and melamine which has been heated to about 950° C. in an ammonia atmosphere. Other examples of such crude boron nitride are the reaction products of boron trichloride and ammonia at or below room temperature. Many other methods of making crude boron nitride which result in products useful in the practice of this invention will suggest themselves to those skilled in the art. It is desirable that the crude boron nitride contain at least about 70 percent by weight of chemically combined boron-nitrogen complex.

A nitrogenous environment, which may be supplied by the crude boron nitride or by an additional atmosphere, is necessary because this method is believed to depend on the fact that at the coating temperature the nitrogen reacts with the graphite to form a complex cyanogen type gas. At this temperature oxides of boron and low molecular weight fractions of boron nitride sublime and dissociate in the presence of the cyanide radical present in the cyanogen gas. Various complex intermediate products are thought to be formed by the reaction of cyanogen, the dissociation products of boron nitride and boric oxides, graphite, boron nitride, and boric oxides. Some of these products are boron carbides and ternary boron-nitrogen-carbon compounds. These products tend to deposit on the surface of the graphite article and from a base upon which boron nitride will adhere. Only a very small amount of boron carbide need deposit on the graphite article in order to provide an adherent base for the boron nitride coating since this material acts merely as a sort of adhesive which is mutually compatible with both boron nitride and graphite and therefore joins them together.

It has been found that one treatment of a graphite article in accord with the above-noted procedure is sufficient to form a boron nitride coating on the article. It is usually preferred, however, to subject the article to at least three successive coating cycles, using a fresh packing of crude boron nitride for each cycle, in order to insure the formation of a substantially continuous coating of sufficient thickness to provide corrosion resistance. Depending upon the mass of crude boron nitride in contact with the graphite, each of the coating cycles should last from 45 minutes to about three hours in order to obtain the maximum thickness. The thickness of the boron nitride coating is dependent both upon the total heating time of the packed article and upon the number of times the packing is changed. In this respect, each packing of crude boron nitride will supply the same amounts of boron nitride coating regardless of the heating time after the optimum heating time for that packing has elapsed. Additionally, the heating temperature is at least partially determinative of the coating thickness and density. Boron nitride coatings up to $\frac{1}{32}$ inch thick have been provided using three successive heating cycles and this thickness has been doubled where five successive heating cycles were employed. Where the coating temperature was about 1900° C. and the heating time was about 3 hours, a coating density of 0.75 gram per cubic centimeter resulted.

Microscopic and X-ray analysis of articles coated by the procedure discussed above has shown that the final article has three regions; graphite, boron carbide and boron nitride. These tests have also shown that the interface between the boron carbide and boron nitride layer contains interdiffusion. This results in a mixed coating which is substantially all boron carbide adjacent the graphite wherein the proportion of boron carbide decreases and the proportion of boron nitride increases as the coating thickness increases until on the outside of the coating it is substantially all boron nitride, in some cases as much as 99.5 percent boron nitride.

The following may be cited as specific examples of the practice of this invention:

*Example I*

A 2 inch cube of graphite was packed in crude boron nitride, in a graphite capsule. The crude boron nitride was the reaction product of boric acid and melamine heated in an ammonia atmosphere at 950° C. The capsule and its contents were heated to 1900° C. for 3 hours under an argon atmosphere to prevent oxidation and then cooled to room temperature. The packing was replaced with fresh crude boron nitride made in the same manner and the heating cycle repeated. This was done three times in all and resulted in a coating of boron nitride, with an intermediate region of boron carbide, on all faces and corners of the original article 1/32 inch thick.

*Example II*

A graphite tray having inside dimensions 1/2" wide, 1/2" deep by 5 inches long, was filled with the room temperature reaction product of boron trifluoride and ammonia. This reaction product has not been identified completely but contains at least the component identifiable by X-ray diffraction as trichloroborazole. The reaction mixture was then covered with a flat graphite plate and the tray heated at 2000° C. for 45 minutes in a tube furnace while an atmosphere of 10 percent hydrogen–90 percent nitrogen was swept through the tube. After two such processing sequences a .002" thick coating had been deposited within the tray.

It was observed that the exterior of the graphite trays showed considerable corrosion even after the first heating to 2000° C. in a 10–90 hydrogen nitrogen atmosphere. Judging by the firm adhesion of the coating, there was no evidence of such corrosion at the interface between the interior graphite surface and the deposited coating. Evidently the coating of this invention, even when as thin as .001 to .002", withstands the corrosive action of hydrogen nitrogen at this temperature.

Graphite bars, 1/2" by 1/2" in cross section were also coated by embedding them in a graphite capsule in the above described crude boron nitride and heating the capsule to 2000° C. in a hydrogen-nitrogen atmosphere. Bars thus coated are found to resist the corrosive action of pure ammonia at 1000° C. indefinitely.

*Example III*

Graphite trays and bars were also coated by heating them to 2000° C. under conditions identical to those described in Example II except that the crude boron nitride used was prepared by heating ammonia at atmospheric pressure in contact with $B_2O_3$ for 24 hours at from 250° to 300° C. This reaction produces a crude form of boron nitride consisting largely of borimine, $B_2(NH)_3$. This material is especially productive of the $B_4C$—BN coating of the invention. Articles confined in a capsule when heated to 2000° C. while embedded in this material acquired a .002" thick coating in one hour.

*Example IV*

Under conditions identical to those described in the examples, crucibles, vaporization boats, nozzles, 17 inch by 8 inch by 1/2 inch plates, and 6 inch by 1 inch diameter tubes of both coarse and fine grained graphite stock were coated with continuous layers of boron nitride from 1/32 inch to 1/16 inch thick. Lampblack base amorphous carbon tubes have also been coated with boron nitride-boron carbide as described above in an environment and under conditions substantially similar to those described in the aforementioned examples.

Other reactions which result in crude boron nitride suitable for use in applying a boron nitride coating on graphite are:

$$2B + N_2 \rightarrow 2BN$$
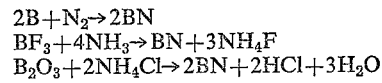
$$B_2O_3 + 2NH_4Cl \rightarrow 2BN + 2HCl + 3H_2O$$

at higher than 400° C. Also the reaction:

proceeds at temperatures above 800° C.

Whether or not a nitrogenous atmosphere is used in conjunction with the crude boron nitride to apply a coating according to this invention is dependent somewhat upon the rate of temperature rise employed and somewhat upon the size and type of container used as well as upon the volume of crude boron nitride in contact with the graphite article. A more important consideration however is the boron-nitride chemical complex content of the crude boron nitride and the availability of this material to coat the graphite article. It has been found to be most desirable to use such a nitrogenous atmosphere particularly when the crude boron nitride has been manufactured by a process which utilizes reaction temperatures which are high, near 1200° C. With crude boron nitrides produced at lower temperatures it is usually only necessary to provide an atmosphere which will protect the article and container against oxidation.

A great many articles coated according to this invention have been subjected to liquid and/or vaporous aluminum and alloys thereof to determine their corrosion resistance. In one such test a 1 inch diameter 6 inch long cylinder of graphite having a 1/16 inch thick continuous coating of boron nitride thereon was partially immersed for 4 weeks in a molten bath of a corrosive aluminum alloy at 1350° F. The alloy contained 5.2 to 6.2% zinc, 2.1 to 2.9% magnesium, 1.4 to 1.7% copper, 0.4% chromium and the rest aluminum. After this period of immersion the article was removed from the bath and vapor and it was found that no appreciable attack had been made on it by the alloy, either liquid or vapor.

In another test a graphite crucible was given a 1/32 inch coating of boron nitride, aluminum was placed therein and the crucible was heated until all the aluminum was evaporated. This was repeated three times making a total evaporation time of 2 1/2 hours. The evaporations were conducted in a vacuum at 1450° C. At the end of the evaporations, the crucible was tested and found to have suffered practically no destructive corrosion.

By the use of this invention the beneficial properties of graphite; heat and electrical conductivity, thermal shock resistance and high temperature stability, and the beneficial properties of the boron nitride; resistance to aluminum and aluminum alloy corrosion and high temperature stability are suitably combined into one article.

This application is a continuation-in-part of U.S. Serial No. 8,214, filed February 12, 1960, and now abandoned.

What is claimed is:

1. A carbon article having a continuous outer coating of boron nitride and an intermediate continuous region of boron carbide between said carbon and boron nitride.

2. A graphite article having a substantially impermeable, uniformly distributed outer coating of boron nitride and an intermediate continuous region of boron carbide between said graphite and said boron nitride.

3. The method of coating a carbon article with boron nitride and an intermediate continuous region of boron carbide which method comprises packing said carbon article in crude boron nitride; heating said packed article to between 1800° C. and 2300° C. under a non-oxidizing atmosphere; and cooling said packed article.

4. The method as described in claim 3 wherein said article is graphite.

5. The method as described in claim 3 wherein said atmosphere is nitrogenous.

6. The method of coating a graphite article with boron nitride and an intermediate continuous region of boron carbide which method comprises packing said graphite article in crude boron nitride; heating said packed article to about 1900° C under a non-oxidizing atmosphere for about 3 hours; and cooling said packed article.

7. The method described in claim 6 wherein said heating and cooling cycle are repeated at least three times, each cycle being carried out in a fresh supply of crude boron nitride.

8. The method described in claim 6 wherein said atmosphere is nitrogenous.

9. The method described in claim 6 wherein said crude boron nitride is made from a reaction occurring at less than 1200° C.

10. The method described in claim 9 wherein said reaction is one selected from the group consisting of boric anhydride and ammonia, boron trifluoride and ammonia, boron trichloride and ammonia, boron trichloride and melamine, boric anhydride and ammonium salts, and boric anhydride and cyanide.

References Cited in the file of this patent

UNITED STATES PATENTS

| | | |
|---|---|---|
| 448,915 | Erlwein | Mar. 24, 1891 |
| 455,187 | Erlwein | June 30, 1891 |
| 1,098,794 | Fleming | June 2, 1914 |

FOREIGN PATENTS

| | | |
|---|---|---|
| 10,741 | Great Britain | 1890 |
| 10,742 | Great Britain | 1890 |
| 1,222,837 | France | Jan. 25, 1960 |